US009389586B2

(12) United States Patent
Liu et al.

(10) Patent No.: US 9,389,586 B2
(45) Date of Patent: Jul. 12, 2016

(54) DISPLAYING METHOD, APPARATUS AND SYSTEM FOR PROVIDING HOLOGRAPHIC IMAGES TO A PLURALITY OF VIEWERS SIMULTANEOUSLY

(71) Applicant: SHENZHEN ESTAR TECHNOLOGY GROUP CO., LTD., Shenzhen, Guangdong Province (CN)

(72) Inventors: Meihong Liu, Shenzhen (CN); Yihua Chen, Shenzhen (CN)

(73) Assignee: SHENZHEN ESTAR TECHNOLOGY GROUP CO., LTD., Shenzhen, Guangdong Province (CN)

( * ) Notice: Subject to any disclaimer, the term of this patent is extended or adjusted under 35 U.S.C. 154(b) by 20 days.

(21) Appl. No.: 14/574,389

(22) Filed: Dec. 17, 2014

(65) Prior Publication Data

US 2016/0091861 A1    Mar. 31, 2016

(30) Foreign Application Priority Data

Sep. 30, 2014   (CN) .......................... 2014 1 0527713

(51) Int. Cl.
*G03H 1/26*     (2006.01)
*G03H 1/22*     (2006.01)
*G03H 1/08*     (2006.01)
*G02B 27/00*    (2006.01)

(52) U.S. Cl.
CPC ............ *G03H 1/268* (2013.01); *G02B 27/0093* (2013.01); *G03H 1/0891* (2013.01); *G03H 1/2294* (2013.01)

(58) Field of Classification Search
CPC .......... G02B 27/0103; G02B 27/0172; G02B 27/2228; G02B 27/225; G02B 27/2235; G02B 27/0093; G03H 1/268; G03H 1/0891; G03H 1/2294; G03C 9/00; H04N 13/04; H04N 13/0402; H04N 13/0427
See application file for complete search history.

(56) References Cited

U.S. PATENT DOCUMENTS 9,071,834 B2 *   6/2015   Yett ..................... G02B 27/2235

* cited by examiner

*Primary Examiner* — Jennifer L. Doak
(74) *Attorney, Agent, or Firm* — Cheng-Ju Chiang

(57) ABSTRACT

A displaying method, a displaying apparatus and a displaying system for providing holographic images to a plurality of viewers simultaneously are provided. The displaying method comprises: tracking motions of M viewers and eye positions thereof, adjusting rotation angles of programmable mirrors allocated to each of the viewers according to the motions of the eye positions of the viewer, it is predefined that each pixel position of the projection screen corresponds to N adjacent ones of the programmable mirrors; modulating a corresponding left-eye 3D image and a corresponding right-eye 3D image according to the tracked motions of the eye positions of each of the viewers and the rotation angles of the programmable mirrors allocated to the viewer, and projecting the left-eye 3D image and the right-eye 3D image onto the projection screen to control optical projections incident to the left eyes and the right eyes of different viewers.

10 Claims, 7 Drawing Sheets

DISPLAYING METHOD, APPARATUS AND SYSTEM FOR PROVIDING HOLOGRAPHIC IMAGES TO A PLURALITY OF VIEWERS SIMULTANEOUSLY

FIELD OF THE INVENTION

The present disclosure relates to the technical field of visual displaying technologies, and more particularly, to a displaying method, a displaying apparatus and a displaying system for providing holographic images to a plurality of viewers simultaneously.

BACKGROUND OF THE INVENTION

Nowadays, holographic displaying technologies have been developed. The term "holographic" may be understood as displaying objects or frames in a three-dimensional (3D) form (i.e., presenting all frames at all view angles of an object). The holographic imaging technologies comprise recording and reproducing images of all frames at all view angles of an object by means of a special technical means so that a visual effect totally the same as the real-world scene is perceived by human eyes.

In the prior art, holographic images can be provided by 3D displaying technologies, and such displaying technologies are being applied increasingly widely. These displaying technologies are implemented not only in the field of computer graphics but also in other different circumstances and technologies. In terms of the 3D displaying technologies, the user usually has to wear a headpiece, a pair of special glasses or the like to transform a planar image into a virtual 3D image. However, this is implemented on an individual basis and is troublesome for the user: for the user who wears a headpiece, a pair of special glasses or the like, the 3D image can only be displayed to the device of the very user alone.

Although these technologies are generally successful, they have not been widely accepted because viewers usually do not like wearing something in front of the eyes. Furthermore, it is impossible for these technologies to project a 3D image to one or more passersby, a group of partners or all audiences simultaneously. Accordingly, it will be very favorable to provide a solution capable of satisfying such a need of viewing a 3D image simultaneously so that a uniquely customized automatic 3D image can be presented to each of a plurality of viewers (i.e., the image seen by each of the viewers is completely different from those seen by any other viewers) who are located in a same viewing environment and who can move freely.

SUMMARY OF THE INVENTION

The main technical problem to be solved by the present disclosure is to provide a displaying method, a displaying apparatus and a displaying system for providing holographic images to a plurality of viewers simultaneously, which allow the viewers to move completely freely without any problem and allow each of the viewers to see a uniquely customized (holographic) 3D image.

To solve the aforesaid technical problem, a technical solution adopted by the present disclosure is to provide a displaying method for providing holographic images to a plurality of viewers simultaneously, which comprises the following steps of: tracking motions of M viewers and eye positions thereof, where M is a natural number greater than 0; adjusting rotation angles of programmable mirrors allocated to each of the viewers correspondingly according to the tracked motions of the eye positions of the viewer so that two programmable mirrors in each pixel of a projection screen reflect projection light rays corresponding to the left eye and the right eye to the left eye and the right eye of the viewer respectively, wherein the programmable mirrors are distributed on a surface of the projection screen to form a programmable mirror array, it is predefined that each pixel position of the projection screen corresponds to N adjacent ones of the programmable mirrors, the N adjacent programmable mirrors corresponding to each pixel position of the projection screen are correspondingly allocated to M viewers in advance, and each eye of each of the viewers is only allocated one of the N programmable mirrors, where N is a natural number greater than 0; and modulating a corresponding left-eye 3D image and a corresponding right-eye 3D image according to the tracked motions of the eye positions of each of the viewers and the rotation angles of the programmable mirrors allocated to the viewer, and projecting the left-eye 3D image and the right-eye 3D image onto the projection screen to control optical projections incident to the left eyes and the right eyes of different viewers.

Preferably, the displaying method for providing holographic images to a plurality of viewers simultaneously further comprises the following steps before the step of tracking motions of M viewers and eye positions thereof if $M=N/2$: tracking the viewers to determine the number M of the viewers; and allocating N adjacent programmable mirrors having corresponding positions to each pixel of the projection screen according to the number M of the tracked viewers.

Preferably, the displaying method for providing holographic images to a plurality of viewers simultaneously further comprises the following step after the step of adjusting rotation angles of programmable mirrors allocated to each of the viewers correspondingly according to the tracked motions of the eye positions of the viewer if $M<N/2$: keeping those of the N programmable mirrors corresponding to each pixel of the projection screen, which are not allocated to any viewer, in an initial state so that they will not reflect any 3D image to any of the viewers.

Preferably, the step of adjusting rotation angles of programmable mirrors allocated to each of the viewers correspondingly according to the tracked motions of the eye positions the viewer is specifically as follows: adjusting angles of the programmable mirrors allocated to the viewer relative to the surface of the projection screen correspondingly according to the tracked motions of the eye positions of each of the viewers so as to change a normal direction of each of the programmable mirrors.

Preferably, the step of modulating a corresponding left-eye 3D image and a corresponding right-eye 3D image according to the motions of the eye positions of each of the viewers and the rotation angles of the programmable mirrors allocated to the viewer, and projecting the left-eye 3D image and the right-eye 3D image onto the projection screen comprises: associating with the normals of the programmable mirrors allocated to the viewer; and projecting the incident light of the left-eye 3D image and the right-eye 3D image respectively to normal positions of the programmable mirrors allocated to the viewers at a corresponding pixel of the projection screen, and through reflection from the programmable mirrors, projecting the incident light of the left-eye 3D image and the right-eye 3D image from the normal positions to the left eye and the right eye of the viewer respectively so that the left-eye 3D image and the right-eye 3D image are projected to corresponding positions of the left eye and the right eye respectively.

Preferably, the displaying method further comprises the following step of: in response to the motions of the eye positions of the M tracked viewers, adjusting the left-eye 3D image and the right-eye 3D image correspondingly to generate a holographic image.

To solve the aforesaid technical problem, another technical solution adopted by the present disclosure is to provide a displaying apparatus for providing holographic images to a plurality of viewers simultaneously, which comprises: a projection screen, having an array of programmable reflective units distributed on a surface thereof, wherein each pixel of the projection screen is allocated N adjacent programmable reflective units having corresponding positions in advance, where N is a natural number greater than 0; a control unit, being configured to allocate the programmable reflective units of each pixel position of the projection screen to different viewers, with each eye of each of the viewers being allocated only one of the programmable reflective units of each pixel position of the projection screen; and adjust a rotation angle of the programmable reflective unit allocated to the viewer correspondingly according to the motions of the eye positions of each of the viewers so that two programmable reflective units in each of the pixels reflect projection light rays corresponding to the left eye and the right eye to the left eye and the right eye of the viewer respectively.

To solve the aforesaid technical problem, still another technical solution adopted by the present disclosure is to provide a displaying system for providing holographic images to a plurality of viewers simultaneously, which comprises a tracking device, a display apparatus, a 3D image processing apparatus and a projection device. The tracking device is configured to track viewers to determine the number M of the viewers, and to track motions of eye positions of each of the viewers, where M is a natural number greater than 0. The display apparatus comprises: a projection screen, having an array of programmable reflective units distributed on a surface thereof, wherein each pixel of the projection screen is allocated N adjacent programmable reflective units having corresponding positions in advance, where N is a natural number greater than 0; a control unit, being configured to acquire the M viewers and the motions of the eye positions of each of the viewers tracked by the tracking device, allocate the N adjacent programmable reflective units of each pixel position of the projection screen to M viewers correspondingly, with each eye of each of the viewers being allocated only one of the N programmable reflective units; and adjust a rotation angle of the programmable reflective unit allocated to the viewer correspondingly according to the motions of the eye positions of each of the viewers so that two programmable mirrors in each of the pixels reflect projection light rays corresponding to the left eye and the right eye to the left eye and the right eye of the viewer respectively. The 3D image processing apparatus is configured to modulate a corresponding left-eye 3D image and a corresponding right-eye 3D image according to the motions of the eye positions of each of the viewers tracked by the tracking device and the reflection angles of the programmable reflective units allocated by the control unit to the viewer, and control the projection device to project the left-eye 3D image and the right-eye 3D image onto the projection screen respectively to control optical projections incident to the left eyes and the right eyes of the different viewers.

Preferably, the 3D image processing apparatus comprises: an image processing unit, being configured to render an image to be displayed into a 3D image; a display interface and image dividing unit, being configured to divide the 3D image from the image processing unit into a left-eye 3D image and a right-eye 3D image; a signal processing unit, being configured to generate a corresponding left-eye image modulation signal and a corresponding right-eye image modulation signal according to the motions of the eye positions of the viewers tracked by the tracking device and the reflection angles of the programmable reflective units allocated by the control unit to the viewers; a left-eye image modulation unit, being configured to modulate the left-eye 3D image in response to the left-eye image modulation signal generated by the signal processing unit so as to control the projection device to project the modulated left-eye 3D image onto the projection screen; and a right-eye image modulation unit, being configured to modulate the right-eye 3D image in response to the right-eye image modulation signal generated by the signal processing unit so as to control the projection device to project the modulated right-eye 3D image onto the projection screen.

Preferably, the control unit adjusts angles of the programmable reflective units allocated to the viewer relative to the surface of the projection screen correspondingly according to the motions of the eye positions of each of the viewers tracked by the tracking device so as to change a normal direction of each of the programmable reflective units; the signal processing unit generates the left-eye image modulation signal and the right-eye image modulation signal according to the motions of the eye positions of the viewers tracked by the tracking device and the normal directions of the programmable reflective units allocated by the control unit to the viewers; and the left-eye image modulation unit and the right-eye image modulation unit project the incident light of the left-eye 3D image and the right-eye 3D image respectively to normal positions of the programmable reflective units allocated to the viewers at a corresponding pixel of the projection screen in response to the left-eye image modulation signal and the right-eye image modulation signal generated by the signal processing unit, and through reflection from the programmable reflective units, project the incident light of the left-eye 3D image and the right-eye 3D image from the normal positions to the left eye and the right eye of the viewer respectively so that the left-eye 3D image and the right-eye 3D image are projected to corresponding positions of the left eye and the right eye respectively.

The present disclosure has the following benefits: as compared to the prior art, the present disclosure has the programmable mirrors arrayed on the surface of the projection screen and predefines corresponding N adjacent programmable mirrors for each pixel position of the projection screen, and allocates the N adjacent programmable mirrors corresponding to each pixel position of the projection screen to M tracked viewers in such a way that each eye of each of the viewers is allocated only one of the N programmable mirrors. Then, according to the motions of the eye positions of each of the viewers tracked and the adjusted rotation angles of the corresponding programmable mirrors, the left-eye 3D image and the right-eye 3D image are modulated correspondingly so that, when being projected onto the projection screen, the left-eye 3D image and the right-eye 3D image can be incident into the left eyes and the right eyes of different viewers as optical projections. Thereby, each of the viewers can move completely freely without any problem and see a uniquely customized 3D image.

Figure 1:
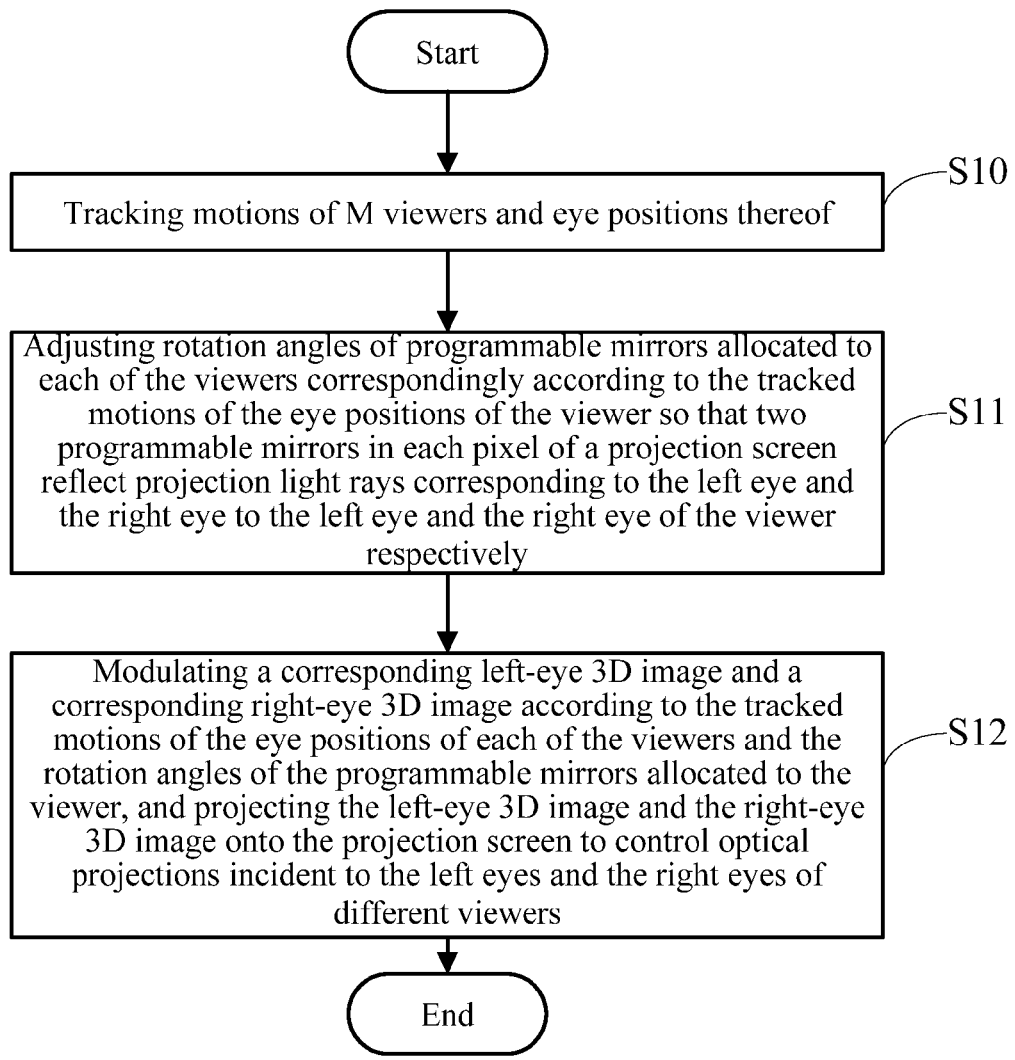
FIG. 1 is a schematic flowchart diagram of a displaying method for providing holographic images to a plurality of viewers simultaneously according to a first embodiment of the present disclosure.

| Reference Numerals of Elements | |
|---|---|
| Projection Device | 13 |
| Projection Screen | 14 |
| Pixel | 140 |
| Programmable mirror | 15a, 15b, 15c, 15d |
| Viewer | 16, 17 |
| Incident light rays | 16a, 16b, 17a, 17b |
| Apparatus | 50, 62 |
| Projection Screen | 51, 621 |
| Programmable reflective unit | 52, 623 |
| Control unit | 53, 622 |
| System | 60 |
| Tracking device | 61 |
| 3D image processing apparatus | 63 |
| Image processing unit | 631 |
| Display interface and image dividing unit | 632 |
| Signal processing unit | 633 |
| Left-eye image modulation unit | 634 |
| Right-eye image modulation unit | 635 |
| Projection device | 64 |

DETAILED DESCRIPTION OF THE INVENTION

The present disclosure will be detailed with reference to the attached drawings and embodiments in order to detail the technical contents, the structural features, as well as the objectives and the effects to be achieved of the present disclosure.

Referring to FIG. 1, there is shown a schematic flowchart diagram of a displaying method for providing holographic images to a plurality of viewers simultaneously according to a first embodiment of the present disclosure. The displaying method for providing holographic images to a plurality of viewers simultaneously shown in this embodiment comprises the following steps of:

Step S10, tracking motions of M viewers and eye positions thereof, where M is a natural number greater than 0.

Step S11, adjusting rotation angles of programmable mirrors allocated to each of the viewers correspondingly according to the tracked motions of the eye positions of the viewer so that two programmable mirrors in each pixel of a projection screen reflect projection light rays corresponding to the left eye and the right eye to the left eye and the right eye of the viewer respectively.

The programmable mirrors are distributed on a surface of the projection screen to form a programmable mirror array, it is predefined that each pixel position of the projection screen corresponds to N adjacent ones of the programmable mirrors, the N adjacent programmable mirrors corresponding to each pixel position of the projection screen are correspondingly allocated to M viewers in advance, and each eye of each of the viewers is only allocated one of the N programmable mirrors, where N is a natural number greater than 0.

Further, each pixel of the projection screen corresponds to N adjacent programmable mirrors, and the N mirrors are allocated to M viewers in a first way as follows: two mirrors (called a mirror A and a mirror B hereinbelow) of the N mirrors are allocated to one of the viewers at the same time, and the mirror A corresponds to the left eye of the viewer and the mirror B corresponds to the right eye of the viewer. The other mirrors of the N mirrors are allocated to the other viewers in the same manner. Therefore, each viewer is allocated two of the N mirrors corresponding to each pixel.

In another case, the N mirrors are allocated to M viewers in a second way as follows: all pixels of the projection screen are divided into pixels corresponding to left-eye images and pixels corresponding to the right-eye images, and the pixels corresponding to the left-eye images and the pixels corresponding to the right-eye images are then allocated respectively. Specifically, each of the pixels corresponding to the left-eye images corresponds to N mirrors; and a first one of the N mirrors is allocated to one viewer, and a second one of the N mirrors is allocated to another viewer, and so on. Thereby, each mirror is allocated to one viewer correspondingly so that each viewer is allocated a pixel corresponding to the left-eye image. Similarly, each of the pixels corresponding to the right-eye images also corresponds to N mirrors; and a first one of the N mirrors is allocated to a viewer, and a second one of the N mirrors is allocated to another viewer, and so on. Thereby, each pixel is allocated to one viewer correspondingly so that each viewer is allocated a pixel corresponding to the right-eye image.

Step S12, modulating a corresponding left-eye 3D image and a corresponding right-eye 3D image according to the tracked motions of the eye positions of each of the viewers and the rotation angles of the programmable mirrors allocated to the viewer, and projecting the left-eye 3D image and the right-eye 3D image onto the projection screen to control optical projections incident to the left eyes and the right eyes of different viewers.

Figure 2:
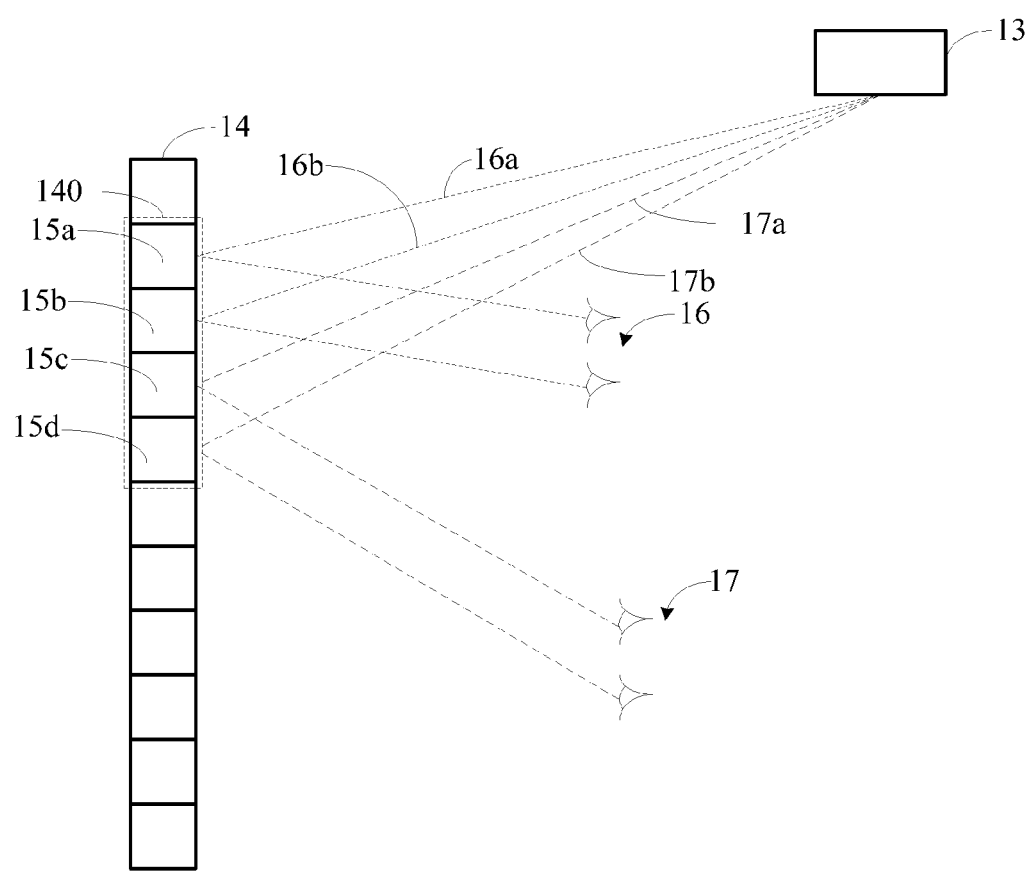
FIG. 2 is a schematic view illustrating principles of a displaying method for providing holographic images to a plurality of viewers simultaneously according to an embodiment of the present disclosure.

Referring also to FIG. 2, there is shown a schematic view illustrating principles of a displaying method for providing holographic images to a plurality of viewers simultaneously according to an embodiment of the present disclosure. In this case, there are two viewers 16 and 17, where programmable mirrors 15a and 15b arrayed on a surface of a projection screen 14 are allocated to the left eye and the right eye of the viewer 16 respectively, and programmable mirrors 15c and 15d are allocated to the left eye and the right eye of the viewer 17 respectively. The programmable mirrors 15a, 15b, 15c and 15d are disposed corresponding to a pixel 140 on the surface of the projection screen 14. When projection light rays are projected towards the projection screen 14 by a projection device 13, incident light rays 16a and 16b are reflected to the left eye and the right eye of the viewer 16 by the corresponding programmable mirrors 15a and 15b respectively. Similarly, incident light rays 17a and 17b are reflected to the left eye and the right eye of the viewer 17 by the corresponding programmable mirrors 15c and 15d respectively.

Figure 3:
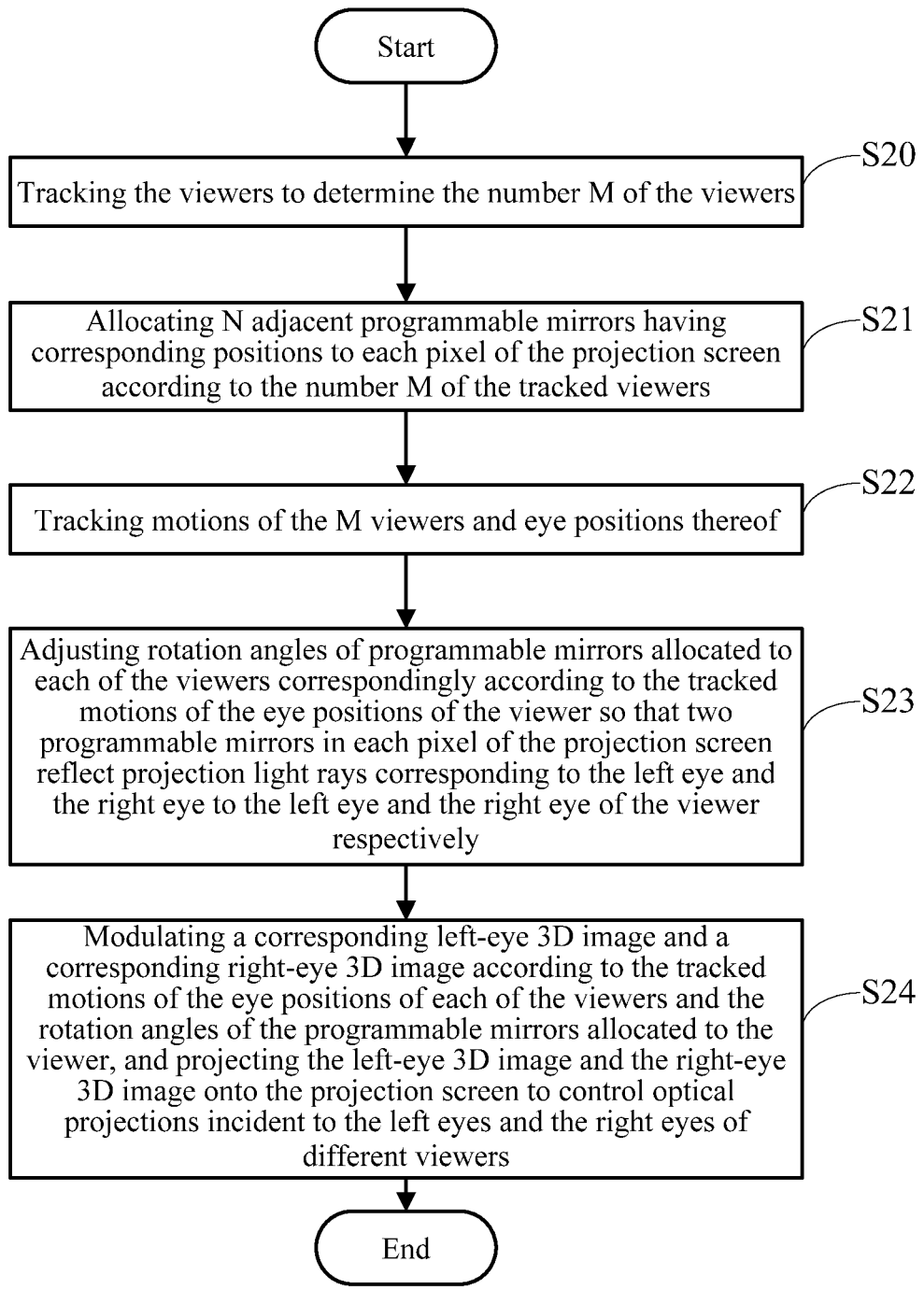
FIG. 3 is a schematic flowchart diagram of a displaying method for providing holographic images to a plurality of viewers simultaneously according to a second embodiment of the present disclosure.

Referring to FIG. 3, there is shown a schematic flowchart diagram of a displaying method for providing holographic images to a plurality of viewers simultaneously according to a second embodiment of the present disclosure. The displaying method for providing holographic images to a plurality of viewers simultaneously shown in this embodiment comprises the following steps of:

Step S20, tracking the viewers to determine the number M of the viewers. Where, M is a natural number greater than 0.

Step S21, allocating N adjacent programmable mirrors having corresponding positions to each pixel of the projection screen according to the number M of the tracked viewers.

The programmable mirrors are distributed on a surface of the projection screen to form a programmable mirror array.

In this embodiment, the value of M is equal to that of N/2. For example, if the number of the tracked viewers is 3, then each pixel of the projection screen corresponds to 6 adjacent programmable mirrors at the corresponding positions.

This embodiment is distributing the programmable mirrors according to the above first ways. That is, the number N of the adjacent programmable mirrors in each pixel is determined by the number M of the views. Preferably, in other embodiments, the present disclosure may be performed by the above second way, which is similar with the principle of determining the number N of the adjacent programmable mirrors in each pixel by the number M of the views, and it is not described herein.

Step S22, tracking motions of the M viewers and eye positions thereof.

Step S23, adjusting rotation angles of programmable mirrors allocated to each of the viewers correspondingly according to the tracked motions of the eye positions of the viewer so that two programmable mirrors in each pixel of the projection screen reflect projection light rays corresponding to the left eye and the right eye to the left eye and the right eye of the viewer respectively.

The N adjacent programmable mirrors corresponding to each pixel position of the projection screen are correspondingly allocated to M viewers in advance, and each eye of each of the viewers is only allocated one of the N programmable mirrors, where N is a natural number greater than 0.

Step S24, modulating a corresponding left-eye 3D image and a corresponding right-eye 3D image according to the tracked motions of the eye positions of each of the viewers and the rotation angles of the programmable mirrors allocated to the viewer, and projecting the left-eye 3D image and the right-eye 3D image onto the projection screen to control optical projections incident to the left eyes and the right eyes of different viewers.

Further, the left-eye 3D image and the right-eye 3D image are adjusted correspondingly to generate a holographic image in response to the motions of the eye positions of the M tracked viewers, and the holographic image is projected onto the projection screen so that corresponding holographic images can be viewed by different viewers.

Figure 4:
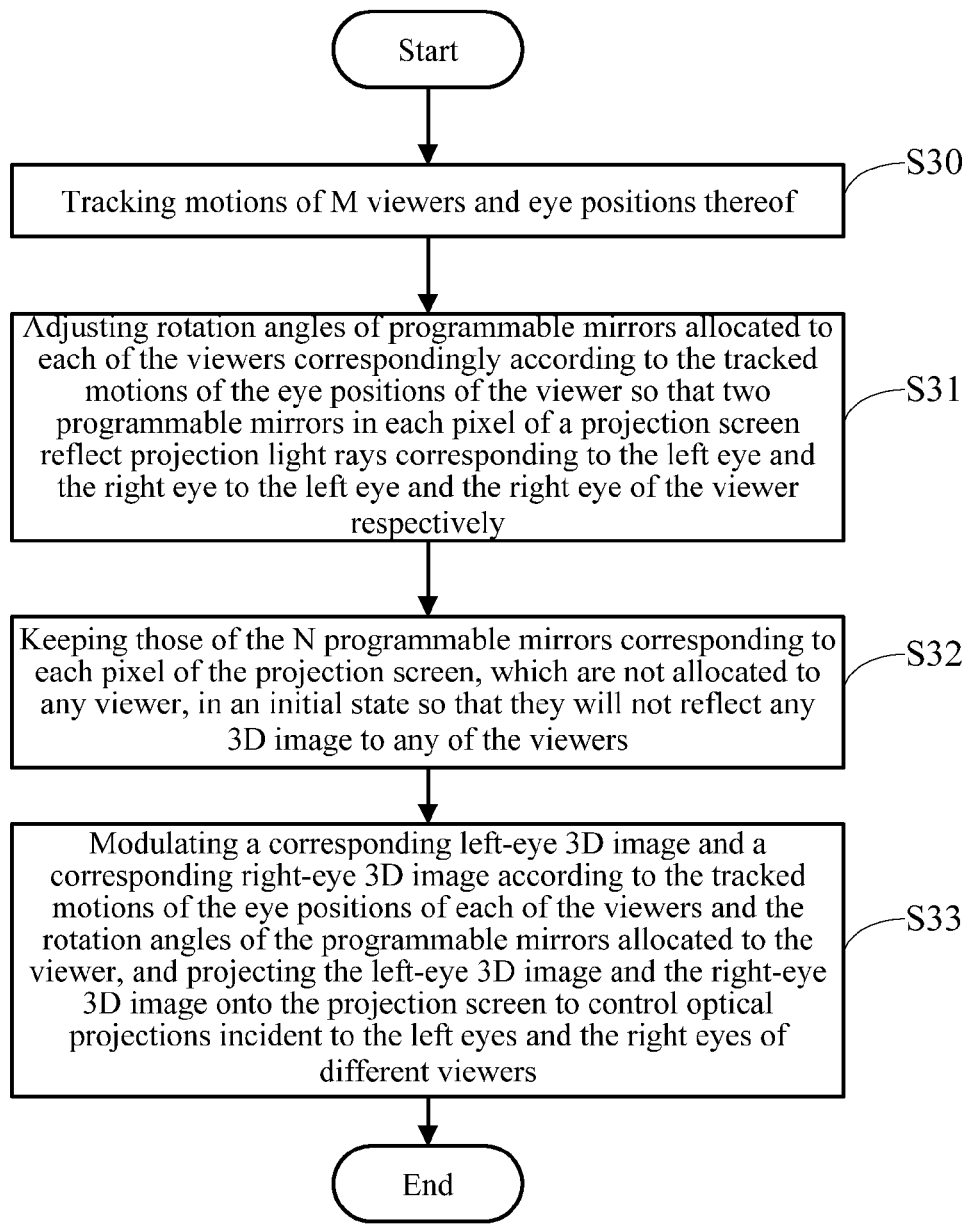
FIG. 4 is a schematic flowchart diagram of a displaying method for providing holographic images to a plurality of viewers simultaneously according a third embodiment of the present disclosure.

Referring to FIG. 4, there is shown a schematic flowchart diagram of a displaying method for providing holographic images to a plurality of viewers simultaneously according to a third embodiment of the present disclosure. The displaying method for providing holographic images to a plurality of viewers simultaneously shown in this embodiment comprises the following steps of:

Step S30, tracking motions of M viewers and eye positions thereof, where M is a natural number greater than 0.

In this embodiment, the value of M is less than that of N/2. For example, if the number of the tracked viewers is 2, but each pixel of the projection screen comprises 6 adjacent programmable mirrors at the corresponding positions.

Step S31, adjusting rotation angles of programmable mirrors allocated to each of the viewers correspondingly according to the tracked motions of the eye positions of the viewer so that two programmable mirrors in each pixel of a projection screen reflect projection light rays corresponding to the left eye and the right eye to the left eye and the right eye of the viewer respectively.

The programmable mirrors are distributed on a surface of the projection screen to form a programmable mirror array, it is predefined that each pixel position of the projection screen corresponds to N adjacent ones of the programmable mirrors, the N adjacent programmable mirrors corresponding to each pixel position of the projection screen are correspondingly allocated to M viewers in advance, and each eye of each of the viewers is only allocated one of the N programmable mirrors, where N is a natural number greater than 0.

Further, the step S31 is specifically as follows: adjusting angles of the programmable mirrors allocated to the viewer relative to the surface of the projection screen correspondingly according to the tracked motions of the eye positions of each of the viewers so as to change a normal direction of each of the programmable mirrors.

Step S32, keeping those of the N programmable mirrors corresponding to each pixel of the projection screen, which are not allocated to any viewer, in an initial state so that they will not reflect any 3D image to any of the viewers.

The initial state is a state when a surface of the programmable mirror is perpendicular to or parallel to the surface of the projection screen.

Step S33, modulating a corresponding left-eye 3D image and a corresponding right-eye 3D image according to the tracked motions of the eye positions of each of the viewers and the rotation angles of the programmable mirrors allocated to the viewer, and projecting the left-eye 3D image and the right-eye 3D image onto the projection screen to control optical projections incident to the left eyes and the right eyes of different viewers.

Figure 5:
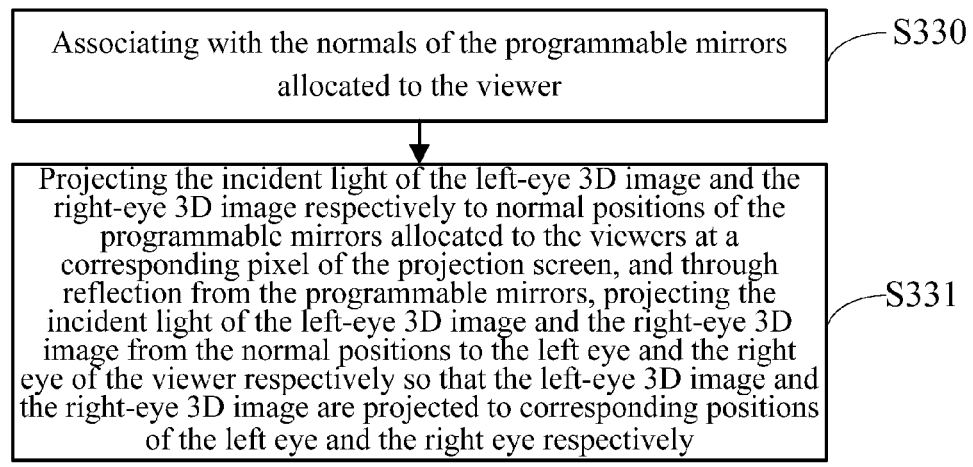
FIG. 5 is a schematic flowchart diagram of a process of modulating a left-eye 3D image and a right-eye 3D image according to an embodiment of the present disclosure.

Referring also to FIG. 5, there is shown a schematic flowchart diagram of a process of modulating a left-eye 3D image and a right-eye 3D image according to an embodiment of the present disclosure. The process (i.e., the step S33) of modulating a left-eye 3D image and a right-eye 3D image shown in this embodiment comprises the following sub-steps:

Sub-step S330, associating with the normals of the programmable mirrors allocated to the viewer.

Sub-step S331, projecting the incident light of the left-eye 3D image and the right-eye 3D image respectively to normal positions of the programmable mirrors allocated to the viewers at a corresponding pixel of the projection screen, and through reflection from the programmable mirrors, projecting the incident light of the left-eye 3D image and the right-eye 3D image from the normal positions to the left eye and the right eye of the viewer respectively so that the left-eye 3D image and the right-eye 3D image are projected to corresponding positions of the left eye and the right eye respectively.

Figure 6:
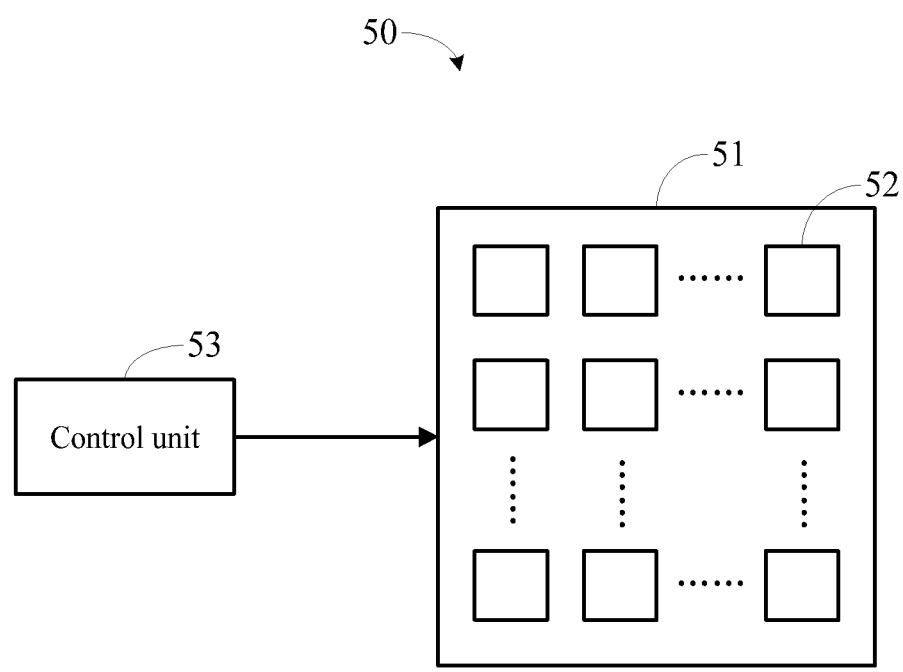
FIG. 6 is a schematic structural view of a displaying apparatus for providing holographic images to a plurality of viewers simultaneously according to an embodiment of the present disclosure.

Referring to FIG. 6, there is shown a schematic structural view of a displaying apparatus for providing holographic images to a plurality of viewers simultaneously according to an embodiment of the present disclosure. The apparatus 50 comprises a projection screen 51 and a control unit 53.

The projection screen 51 has an array of programmable reflective units 52 distributed on a surface thereof. Each pixel of the projection screen 51 is allocated N adjacent programmable reflective units 52 having corresponding positions in advance, and N is a natural number greater than 0.

The control unit 53 is configured to: allocate the programmable reflective units 52 of each pixel position of the projection screen 51 to different viewers, with each eye of each of the viewers being allocated only one of the programmable reflective units 52 of each pixel position of the projection screen 51; and adjust a rotation angle of the programmable reflective unit 52 allocated to the viewer correspondingly according to the motions of the eye positions of each of the viewers so that two programmable reflective units 52 in each of the pixels reflect projection light rays corresponding to the left eye and the right eye to the left eye and the right eye of the viewer respectively.

In this embodiment, the programmable reflective units 52 may be mirrors, and may also be celled liquid crystal units.

When the programmable reflective units 52 are mirrors, the control unit 53 adjusts angles of the programmable mirrors allocated to the viewer relative to the surface of the projection screen 51 correspondingly according to the motions of the eye positions of the viewers so as to change a normal direction of each of the programmable mirrors.

When the programmable reflective units 52 are liquid crystal units, the control unit 53 adjusts a voltage allocated to a driving electrode of each of the liquid crystal units allocated to the viewer correspondingly according to the motions of the eye positions of the viewer so as to change the distribution of the liquid crystals and, therefore, change the refraction angle at which the incident light travels through each of the liquid crystal units.

Figure 7:
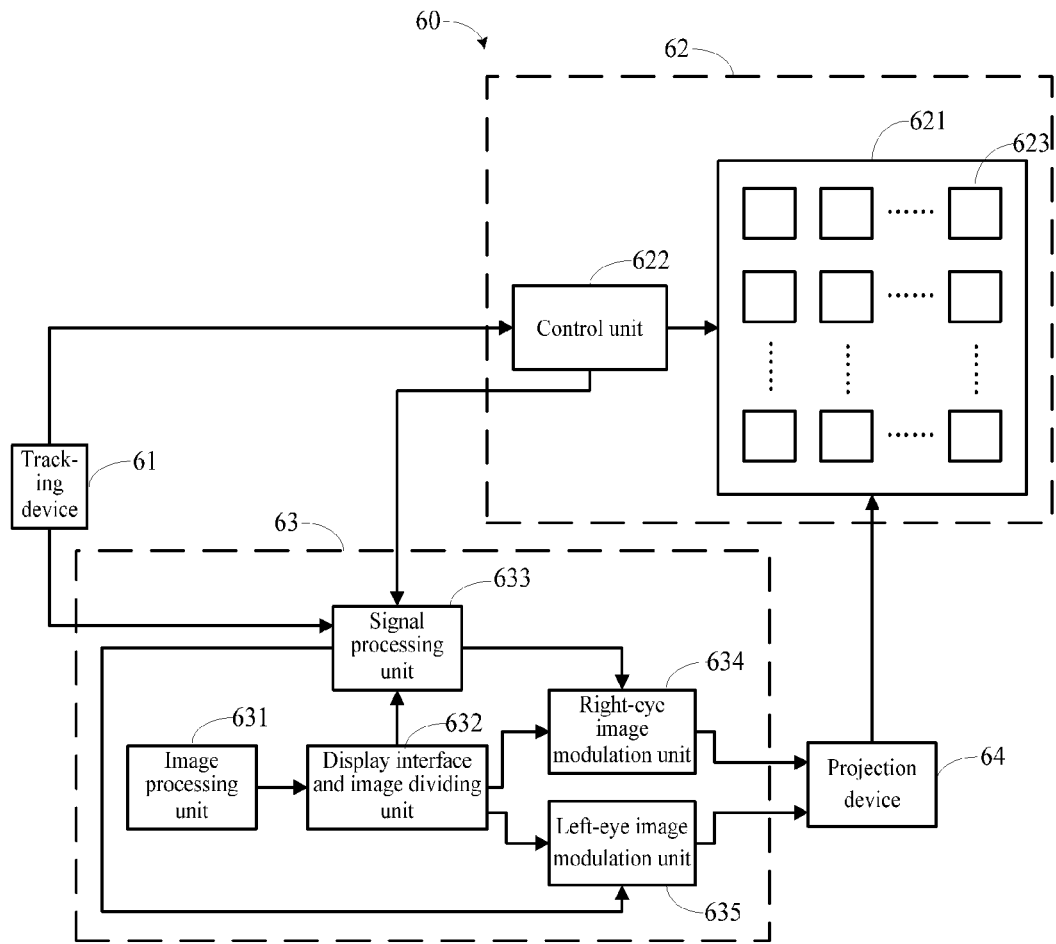
FIG. 7 is a schematic structural view of a displaying system for providing holographic images to a plurality of viewers simultaneously according to an embodiment of the present disclosure.

Referring to FIG. 7, there is shown a schematic structural view of a displaying system for providing holographic images to a plurality of viewers simultaneously according to an embodiment of the present disclosure. The system 60 comprises a tracking device 61, a display apparatus 62, a 3D image processing apparatus 63 and a projection device 64.

The tracking device 61 is configured to track viewers to determine the number M of the viewers, and to track motions of eye positions of each of the viewers, where M is a natural number greater than 0.

The display apparatus 62 comprises a projection screen 621 and a control unit 622. Specifically, the projection screen 621 has an array of programmable reflective units 623 distributed on a surface thereof, and each pixel of the projection screen 621 is allocated N adjacent programmable reflective units 623 having corresponding positions in advance, where N is a natural number greater than 0. The control unit 622 is configured to acquire the M viewers and the motions of the eye positions of each of the viewers tracked by the tracking device 621, allocate the N adjacent programmable reflective units 623 of each pixel position of the projection screen 621 to M viewers correspondingly, with each eye of each of the viewers being allocated only one of the N programmable reflective units 623; and adjust a reflection angle of the programmable reflective unit 623 allocated to the viewer correspondingly according to the motions of the eye positions of each of the viewers so that two programmable reflective units 623 in each of the pixels reflect projection light rays corresponding to the left eye and the right eye to the left eye and the right eye of the viewer respectively.

The 3D image processing apparatus 63 is configured to modulate a corresponding left-eye 3D image and a corresponding right-eye 3D image according to the motions of the eye positions of each of the viewers and the reflection angles of the programmable reflective units 623 allocated by the control unit 62 to the viewer, and control the projection device 64 to project the left-eye 3D image and the right-eye 3D image onto the projection screen 621 respectively to control optical projections incident to the left eyes and the right eyes of the different viewers.

Further, the 3D image processing apparatus 63 is further configured to, in response to the motions of the eye positions of the M viewers tracked by the tracking device 61, adjust the left-eye 3D image and the right-eye 3D image correspondingly to generate a holographic image so as to control the projection device 64 to project the holographic image onto the projection screen 621. Thus, corresponding holographic images can be viewed by different viewers.

Further, the 3D image processing apparatus 63 comprises an image processing unit 631, a display interface and image dividing unit 632, a signal processing unit 633, a left-eye image modulation unit 634, and right-eye image modulation unit 635.

The image processing unit 631 is configured to render an image to be displayed into a 3D image.

The display interface and image dividing unit 632 is configured to divide the 3D image from the image processing unit 631 into a left-eye 3D image and a right-eye 3D image.

The signal processing unit 633 is configured to generate a corresponding left-eye image modulation signal and a corresponding right-eye image modulation signal according to the motions of the eye positions of the viewers tracked by the tracking device 61 and the reflection angles of the programmable reflective units 623 allocated by the control unit 622 to the viewers.

The left-eye image modulation unit 634 is configured to modulate the left-eye 3D image in response to the left-eye image modulation signal generated by the signal processing unit 633 so as to control the projection device 64 to project the modulated left-eye 3D image onto the projection screen 621.

The right-eye image modulation unit 635 is configured to modulate the right-eye 3D image in response to the right-eye image modulation signal generated by the signal processing unit 633 so as to control the projection device 64 to project the modulated right-eye 3D image onto the projection screen 621.

In this embodiment, the programmable reflective units 623 may be mirrors, and may also be celled liquid crystal units.

When the programmable reflective units 623 are mirrors, the control unit 622 adjusts angles of the programmable mirrors allocated to the viewer relative to the surface of the projection screen 621 correspondingly according to the motions of the eye positions of the viewer so as to change a normal direction of each of the programmable mirrors.

Specifically, the signal processing unit 633 generates the left-eye image modulation signal and the right-eye image modulation signal according to the motions of the eye positions of the viewers tracked by the tracking device 61 and the normal directions of the programmable reflective units allocated by the control unit 622 to the viewers.

The left-eye image modulation unit 634 and the right-eye image modulation unit 635 project the incident light of the left-eye 3D image and the right-eye 3D image respectively to normal positions of the programmable reflective units 623 allocated to the viewers at a corresponding pixel of the projection screen 621 in response to the left-eye image modulation signal and the right-eye image modulation signal generated by the signal processing unit 633, and through reflection from the programmable reflective units 623, project the incident light of the left-eye 3D image and the right-eye 3D image from the normal positions to the left eye and the right eye of the viewer respectively so that the left-eye 3D image and the right-eye 3D image are projected to corresponding positions of the left eye and the right eye respectively.

Furthermore, it is apparent to those skilled in the art, the 3D image processing apparatus 63 of the present disclosure may be an integrated circuit, which comprises a non-transitory program storage medium and a processor. The non-transitory program storage medium stores a program executed by the processor to perform the method as follows. That is, it is apparent to those skilled in the art that, the image processing unit 631, the display interface and image dividing unit 632, the signal processing unit 633, the left-eye image modulation unit 634 and the right-eye image modulation unit 635 of the 3D image processing apparatus may be software modules inherently stored in the non-transitory program storage medium, and executed by the processor to perform the above functions.

When the programmable reflective units 623 are liquid crystal units, the control unit 622 adjusts a voltage of a driving electrode of each of the liquid crystal units allocated to the viewer correspondingly according to the motions of the eye positions of the viewer so as to change the distribution of the liquid crystals and change the refraction angle at which the incident light travels through each of the liquid crystal units.

The displaying method, the displaying apparatus and the displaying system for providing holographic images to a plurality of viewers simultaneously of the present disclosure have the programmable mirrors arrayed on the surface of the projection screen and predefine corresponding N adjacent programmable mirrors for each pixel position of the projection screen, and allocate the N adjacent programmable mirrors corresponding to each pixel position of the projection screen to M tracked viewers in such a way that each eye of each of the viewers is allocated only one of the N programmable mirrors. Then, according to the motions of the eye positions of each of the viewers tracked and the adjusted rotation angles of the corresponding programmable mirrors, the left-eye 3D image and the right-eye 3D image are modulated correspondingly so that, when being projected onto the projection screen, the left-eye 3D image and the right-eye 3D image can be incident into the left eyes and the right eyes of different viewers as optical projections. Thereby, each of the viewers can move completely freely without any problem and see a uniquely customized 3D image.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A displaying method for providing holographic images to a plurality of viewers simultaneously, comprising:
    tracking motions of M viewers and eye positions thereof, where M is a natural number greater than 0;
    adjusting rotation angles of programmable mirrors allocated to each of the viewers correspondingly according to the tracked motions of the eye positions of the viewer, so that two programmable mirrors in each pixel of a projection screen reflect projection light rays corresponding to a left eye and a right eye to the left eye and the right eye of a corresponding viewer respectively, wherein the programmable mirrors are distributed on a surface of the projection screen to form a programmable mirror array, it is predefined that each pixel position of the projection screen corresponds to N adjacent ones of the programmable mirrors, the N adjacent programmable mirrors corresponding to each pixel position of the projection screen are correspondingly allocated to M viewers in advance, and each eye of each of the viewers is only allocated one of the N programmable mirrors, where N is a natural number greater than 0; and
    modulating a corresponding left-eye three-dimensional (3D) image and a corresponding right-eye 3D image according to the tracked motions of the eye positions of each of the viewers and the rotation angles of the programmable mirrors allocated to the viewer, and projecting the left-eye 3D image and the right-eye 3D image onto the projection screen to control optical projections incident to the left eyes and the right eyes of different viewers.

2. The displaying method for providing holographic images to a plurality of viewers simultaneously of claim 1, further comprising the following steps before the step of tracking motions of M viewers and eye positions thereof if M=N/2:
    tracking the viewers to determine the number M of the viewers; and
    allocating N adjacent programmable mirrors having corresponding positions to each pixel of the projection screen according to the number M of the tracked viewers.

3. The displaying method for providing holographic images to a plurality of viewers simultaneously of claim 1, further comprising the following step after the step of adjusting rotation angles of programmable mirrors allocated to each of the viewers correspondingly according to the tracked motions of the eye positions of the viewer if M<N/2:
    keeping those of the N programmable mirrors corresponding to each pixel of the projection screen, which are not allocated to any viewer, in an initial state so that they will not reflect any 3D image to any of the viewers.

4. The displaying method for providing holographic images to a plurality of viewers simultaneously of claim 1, wherein the step of adjusting rotation angles of programmable mirrors allocated to each of the viewers correspondingly according to the tracked motions of the eye positions of the viewer is specifically as follows:
    adjusting angles of the programmable mirrors allocated to the viewer relative to the surface of the projection screen correspondingly according to the tracked motions of the eye positions of each of the viewers so as to change a normal direction of each of the programmable mirrors.

5. The displaying method for providing holographic images to a plurality of viewers simultaneously of claim 4, wherein the step of modulating a corresponding left-eye 3D image and a corresponding right-eye 3D image according to the motions of the eye positions of each of the viewers and the rotation angles of the programmable mirrors allocated to the viewer, and projecting the left-eye 3D image and the right-eye 3D image onto the projection screen comprises:
    associating with the normals of the programmable mirrors allocated to the viewer; and
    projecting the incident light of the left-eye 3D image and the right-eye 3D image respectively to normal positions of the programmable mirrors allocated to the viewers at a corresponding pixel of the projection screen, and through reflection from the programmable mirrors, projecting the incident light of the left-eye 3D image and the right-eye 3D image from the normal positions to the left eye and the right eye of the viewer respectively so that the left-eye 3D image and the right-eye 3D image are projected to corresponding positions of the left eye and the right eye respectively.

6. The displaying method for providing holographic images to a plurality of viewers simultaneously of claim 1, further comprising the following step of:
   in response to the motions of the eye positions of the M tracked viewers, adjusting the left-eye 3D image and the right-eye 3D image correspondingly to generate a holographic image.

7. A displaying apparatus for providing holographic images to a plurality of viewers simultaneously, comprising:
   a projection screen, having an array of programmable reflective units distributed on a surface thereof, wherein each pixel of the projection screen is allocated N adjacent programmable reflective units having corresponding positions in advance, where N is a natural number greater than 0; and
   a control unit, being configured to allocate the programmable reflective units of each pixel position of the projection screen to different viewers, with each eye of each of the viewers being allocated only one of the programmable reflective units of each pixel position of the projection screen; and adjust a rotation angle of the programmable reflective unit allocated to the viewer correspondingly according to the motions of the eye positions of each of the viewers so that two programmable reflective units in each of the pixels reflect projection light rays corresponding to the left eye and the right eye to the left eye and the right eye of the viewer respectively.

8. A displaying system for providing holographic images to a plurality of viewers simultaneously, comprising a tracking device, a display apparatus, a 3D image processing apparatus and a projection device; wherein
   the tracking device is configured to track viewers to determine the number M of the viewers, and to track motions of eye positions of each of the viewers, where M is a natural number greater than 0;
   the display apparatus comprises:
      a projection screen, having an array of programmable reflective units distributed on a surface thereof, wherein each pixel of the projection screen is allocated N adjacent programmable reflective units having corresponding positions in advance, where N is a natural number greater than 0; and
      a control unit, being configured to acquire the M viewers and the motions of the eye positions of each of the viewers tracked by the tracking device, allocate the N adjacent programmable reflective units of each pixel position of the projection screen to M viewers correspondingly, with each eye of each of the viewers being allocated only one of the N programmable reflective units; and
   adjust a reflection angle of the programmable reflective unit allocated to the viewer correspondingly according to the motions of the eye positions of each of the viewers so that two programmable mirrors in each of the pixels reflect projection light rays corresponding to the left eye and the right eye to the left eye and the right eye of the viewer respectively;
   the 3D image processing apparatus is configured to modulate a corresponding left-eye 3D image and a corresponding right-eye 3D image according to the motions of the eye positions of each of the viewers tracked by the tracking device and the reflection angles of the programmable reflective units allocated by the control unit to the viewer, and control the projection device to project the left-eye 3D image and the right-eye 3D image onto the projection screen respectively to control optical projections incident to the left eyes and the right eyes of the different viewers.

9. The displaying system for providing holographic images to a plurality of viewers simultaneously of claim 8, wherein the 3D image processing apparatus comprises:
   an image processing unit, being configured to render an image to be displayed into a 3D image;
   a display interface and image dividing unit, being configured to divide the 3D image from the image processing unit into a left-eye 3D image and a right-eye 3D image;
   a signal processing unit, being configured to generate a corresponding left-eye image modulation signal and a corresponding right-eye image modulation signal according to the motions of the eye positions of the viewers tracked by the tracking device and the reflection angles of the programmable reflective units allocated by the control unit to the viewers;
   a left-eye image modulation unit, being configured to modulate the left-eye 3D image in response to the left-eye image modulation signal generated by the signal processing unit so as to control the projection device to project the modulated left-eye 3D image onto the projection screen; and
   a right-eye image modulation unit, being configured to modulate the right-eye 3D image in response to the right-eye image modulation signal generated by the signal processing unit so as to control the projection device to project the modulated right-eye 3D image onto the projection screen.

10. The displaying system for providing holographic images to a plurality of viewers simultaneously of claim 9, wherein the control unit adjusts angles of the programmable reflective units allocated to the viewer relative to the surface of the projection screen correspondingly according to the motions of the eye positions of each of the viewers tracked by the tracking device so as to change a normal direction of each of the programmable reflective units;
   the signal processing unit generates the left-eye image modulation signal and the right-eye image modulation signal according to the motions of the eye positions of the viewers tracked by the tracking device and the normal directions of the programmable reflective units allocated by the control unit to the viewers; and
   the left-eye image modulation unit and the right-eye image modulation unit project the incident light of the left-eye 3D image and the right-eye 3D image respectively to normal positions of the programmable reflective units allocated to the viewers at a corresponding pixel of the projection screen in response to the left-eye image modulation signal and the right-eye image modulation signal generated by the signal processing unit, and through reflection from the programmable reflective units, project the incident light of the left-eye 3D image and the right-eye 3D image from the normal positions to the left eye and the right eye of the viewer respectively so that the left-eye 3D image and the right-eye 3D image are projected to corresponding positions of the left eye and the right eye respectively.

* * * * *